(12) United States Patent
Sai

(10) Patent No.: US 11,916,645 B2
(45) Date of Patent: Feb. 27, 2024

(54) BASE STATION DEVICE, PROGRAM, SYSTEM, AND CONTROL METHOD

(71) Applicant: HAPSMobile Inc., Tokyo (JP)

(72) Inventor: Jutatsu Sai, Kanagawa (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/332,760

(22) Filed: Jun. 12, 2023

(65) Prior Publication Data

US 2023/0318697 A1 Oct. 5, 2023

Related U.S. Application Data

(63) Continuation of application No. PCT/JP2021/046366, filed on Dec. 15, 2021.

(30) Foreign Application Priority Data

Dec. 25, 2020 (JP) .................................. 2020-216724

(51) Int. Cl.
*H04B 7/185* (2006.01)
*H04B 17/345* (2015.01)
*H04L 1/00* (2006.01)

(52) U.S. Cl.
CPC ....... *H04B 7/18504* (2013.01); *H04B 17/345* (2015.01); *H04L 1/0003* (2013.01)

(58) Field of Classification Search
None
See application file for complete search history.

(56) References Cited

U.S. PATENT DOCUMENTS

| 2009/0197590 A1 | 8/2009 | Borran | |
| 2018/0124771 A1* | 5/2018 | Mok | H04W 72/51 |
| 2021/0136694 A1* | 5/2021 | Gao | H04W 52/245 |

(Continued)

FOREIGN PATENT DOCUMENTS

| JP | 2010268377 A | 11/2010 |
| JP | 2011514712 A | 5/2011 |

(Continued)

OTHER PUBLICATIONS (ISA/237) Written Opinion of the International Search Authority for International Patent Application No. PCT/JP2021/046366, mailed by the Japan Patent Office dated Feb. 1, 2022.

*Primary Examiner* — Anh Vu H Ly

(57) ABSTRACT

Provided is a base station device which is mounted to a flight vehicle and forms a multi-cell including a plurality of cells on a ground to provide a wireless communication service to a user terminal in the multi-cell, the base station device including a location information acquisition unit which acquires location information of a user terminal present in the multi-cell, a flight vehicle associated information acquisition unit which acquires flight vehicle associated information, an interference estimation unit which estimates an interfered user terminal having a chance of experiencing an interference from a cell other than a cell in which the user terminal is present among a plurality of user terminals and an interference amount, an MCS decision unit which decides an MCS of an uplink to be assigned to the interfered user terminal, and an MCS notification unit which notifies the interfered user terminal of the MCS.

16 Claims, 6 Drawing Sheets

(56) References Cited

U.S. PATENT DOCUMENTS

2021/0289445 A1* 9/2021 Muruganathan .... H04W 52/146
2022/0014259 A1    1/2022 Sai
2022/0022119 A1    1/2022 Sai

FOREIGN PATENT DOCUMENTS

| JP | 2020167450 A | 10/2020 | | |
|----|----|----|----|----|
| JP | 2020170888 A | 10/2020 | | |
| WO | WO-2017171923 A1 | * | 10/2017 | ............ H04W 4/021 |
| WO | WO-2018175252 A1 | * | 9/2018 | ............ B64C 39/024 |
| WO | WO-2018175870 A1 | * | 9/2018 | ............ G08G 5/0069 |

* cited by examiner

BASE STATION DEVICE, PROGRAM, SYSTEM, AND CONTROL METHOD

The contents of the following patent application(s) are incorporated herein by reference:
NO. 2020-216724 filed in JP on Dec. 25, 2020
NO. PCT/JP2021/046366 filed in WO on Dec. 15, 2021

BACKGROUND

1. Technical Field

The present invention relates to a base station device, a computer readable storage medium, a system, and a control method.

2. Related Art

Patent Document 1 describes a flight vehicle which forms a multi-cell on a ground by irradiating beam towards the ground to provide a wireless communication service to a user terminal in the multi-cell.

LIST OF CITED REFERENCES

Patent Document
Patent Document 1: Japanese Patent Application Publication No. 2020-170888

BRIEF DESCRIPTION OF THE DRAWINGS

FIG. 2 is an explanatory diagram for describing an interference caused by a location variation of the HAPS 100 or the like.

DESCRIPTION OF EXEMPLARY EMBODIMENTS

In a case of a flight vehicle which forms a multi-cell on a ground while flying in a sky, a radio environment of a multi-cell configuration is likely to vary depending on a flight state (circling, and ascending and descending), and there is a tendency that an interference state to a user terminal (which may be referred to as UE (User Equipment)) is also likely to vary. Therefore, a case may occur where an appropriate MCS (Modulation and Coding Scheme) is not assigned depending on timing at which an MCS of a UL (UpLink) to the UE is decided, which leads to a fall of UE throughput. A base station device mounted to the flight vehicle according to the present embodiment regularly acquires, for example, flight vehicle associated information (such as a latitude and a longitude, an altitude, and a gradient), and assigns an appropriate MCS by inter-cell coordinated control of each cell of the multi-cell further based on DMRS (Demodulation Reference Signal) information of a plurality of UEs to aim for an improvement of the UE throughput.

Hereinafter, the present invention will be described through embodiments of the invention, but the following embodiments do not limit the invention according to claims. In addition, not all of the combinations of features described in the embodiments are essential to solution of the invention.

Figure 1:
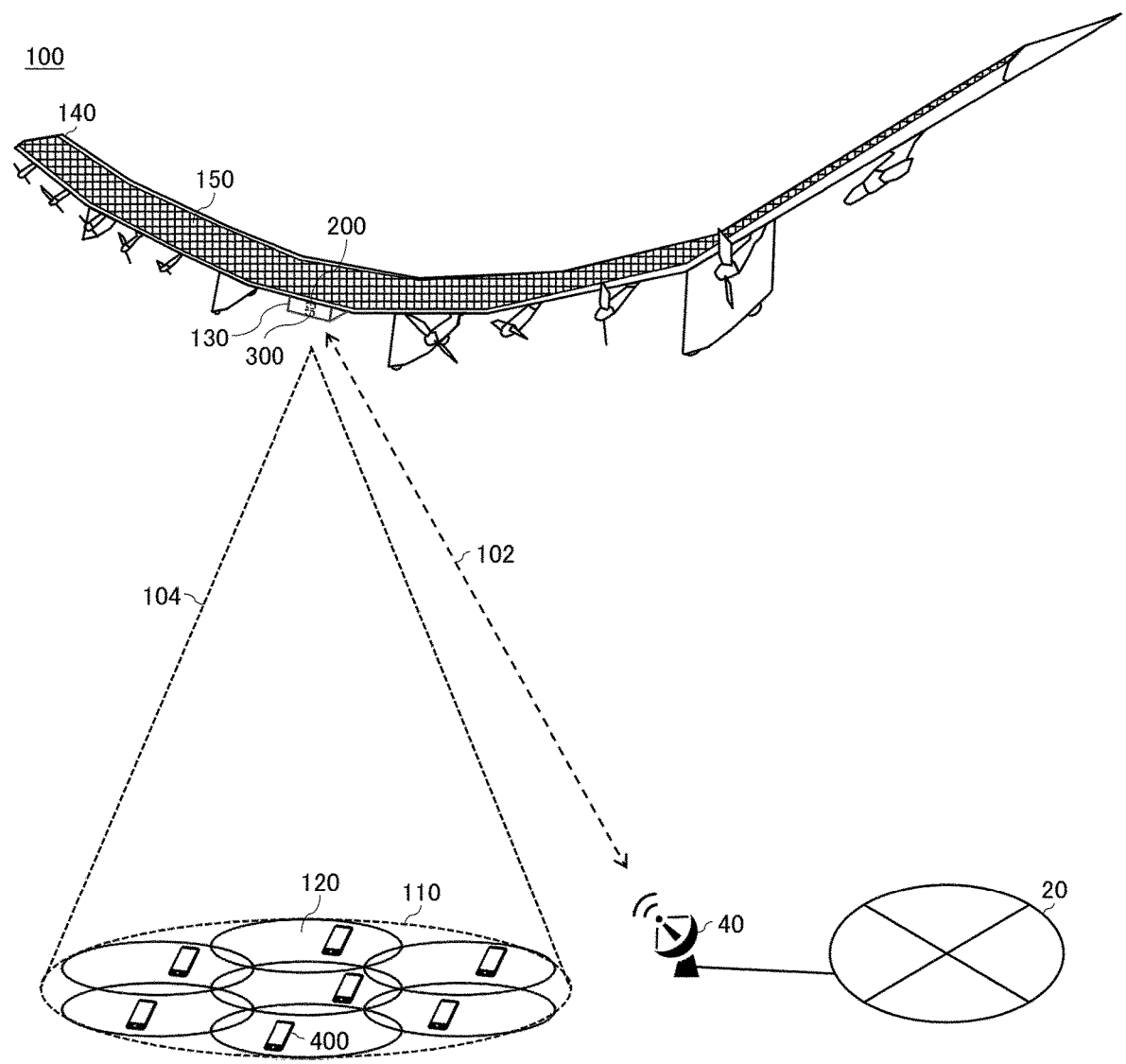
FIG. 1 schematically illustrates an example of a HAPS 100.

FIG. 1 schematically illustrates an example of a HAPS 100. The HAPS 100 may be an example of a flight vehicle. The HAPS 100 may function as a stratospheric platform. The HAPS 100 forms a feeder link 102 with a gateway 40 on the ground while flying in a stratosphere, for example, and also forms a multi-cell 110 by irradiating beam 104 towards the ground. The HAPS 100 provides a wireless communication service to a user terminal 400 in the multi-cell 110.

The HAPS 100 includes a main body section 130, a wing section 140, and a solar panel 150. Electric power generated by the solar panel 150 is stored in one or more batteries arranged in at least any of the main body section 130 or the wing section 140. The electric power stored in the battery is used by each component included in the HAPS 100.

A flight control device 200 and a base station device 300 are arranged in the main body section 130. The flight control device 200 controls flight of the HAPS 100. The base station device 300 controls communication of the HAPS 100. The HAPS 100 and the base station device 300 may constitute a system.

The flight control device 200 controls the flight of the HAPS 100 by controlling, for example, a rotation of a propeller, an angle of a flap or an elevator, or the like. The flight control device 200 may manage various types of sensors included in the HAPS 100. Examples of the sensors include a positioning sensor such as a GPS (Global Positioning System) sensor, a gyro sensor, an acceleration sensor, a wind sensor, and the like. The flight control device 200 may manage a location, an attitude, a movement direction, a movement speed, and the like of the HAPS 100 by outputs of the various types of sensors.

The base station device 300 may form the feeder link 102 with the gateway 40 by using an FL (Feeder Link) antenna. The base station device 300 may access a network 20 via the gateway 40.

The base station device 300 may form the multi-cell 110 by irradiating the beam 104 towards the ground by using an SL (Service Link) antenna. The multi-cell 110 is configured by a plurality of cells 120. In FIG. 1, a case has been exemplified where the number of cells 120 is seven but the number of cells 120 is not limited to this. The base station device 300 may establish a service link with the user terminal 400 in the multi-cell 110.

The base station device 300 relays communication between the network 20 and the user terminal 400 via the feeder link 102 and the service link, for example. The base station device 300 may provide the wireless communication service to the user terminal 400 by relaying the communication between the user terminal 400 and the network 20.

The network 20 may include a core network managed by a telecommunications carrier. The core network may be compliant to an LTE (Long Term Evolution) communication system. That is, the core network may be an EPC (Evolved Packet Core). The core network may be compliant to a 5G (5th Generation) communication system. That is, the core network may be a 5GC (5th Generation Core network). The core network may be compliant to a 3G (3rd Generation) communication system, or may be compliant to a 6G (6th Generation) communication system and subsequent communication systems. The network 20 may include the Internet.

The user terminal 400 may be any communication terminal as long as the user terminal 400 is able to communicate with the HAPS 100. For example, the user terminal 400 is a cellular phone such as a smartphone. The user terminal 400 may also be a tablet terminal, a PC (Personal Computer), and the like. The user terminal 400 may also be a so-called IoT (Internet of Thing) device. The user terminal 400 may include anything that belongs to so-called IoE (Internet of Everything).

The HAPS 100 may circle in a sky above a target area in order to cover the target area on the ground by the multi-cell 110. For example, while carrying out patrol flight in the sky above the target area in a predetermined flight path such as a circular, D-shaped, or 8-shaped flight path, the HAPS 100 maintains the feeder link 102 with the gateway 40 by adjusting an orientation direction of the FL antenna, and maintains the coverage of the target area by the multi-cell 110 by adjusting an orientation direction of the SL antenna. In this manner, patrolling in a fixed flight path in the sky above the target area may be referred to as a fixed point flight.

A location and an attitude of the HAPS 100 regularly varies because of the flight. In addition, the attitude of the HAPS 100 may minutely vary or largely vary depending on an influence of wind or the like. Therefore, a radio environment of the multi-cell 110 is likely to vary depending on a flight state of the HAPS 100. The HAPS 100 forms the multi-cell 110 by a plurality of beams, and all the cells 120 may uniformly move, or each of the plurality of cells 120 may separately move.

Figure 2:
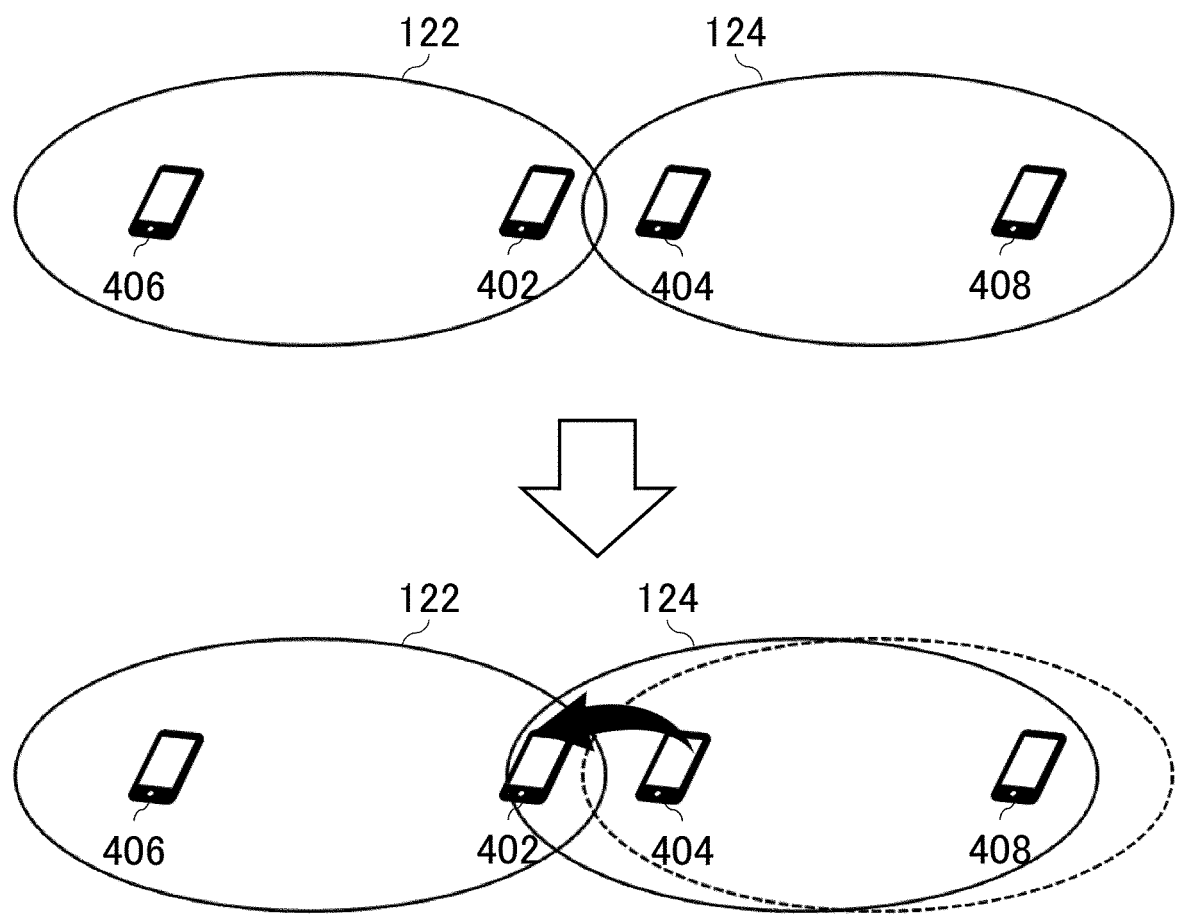

FIG. 2 is an explanatory diagram for describing an interference caused by a location variation of the HAPS 100 or the like. Herein, while focus is on only a cell 122 and a cell 124 which are two cells out of the multi-cell 110, a case where a location of the cell 124 is shifted will be used as an example in the description. In the present example, a user terminal 402 and a user terminal 406 are present in the cell 122, and a user terminal 404 and a user terminal 408 are present in the cell 124.

Before the location of the cell 124 is shifted, the user terminal 402 is located in the cell 122, and the user terminal 404 is located in the cell 124, but after the location of the cell 124 is shifted, the user terminal 402 is located in both the cell 122 and the cell 124. In such a case, when a resource block with a same frequency band and also a same time slot as those of a resource block for the user terminal 402 in the cell 122 is assigned to the user terminal 404 located in proximity to the user terminal 402, communication of the user terminal 404 interferes with the user terminal 402, and the throughput falls.

Figure 3:
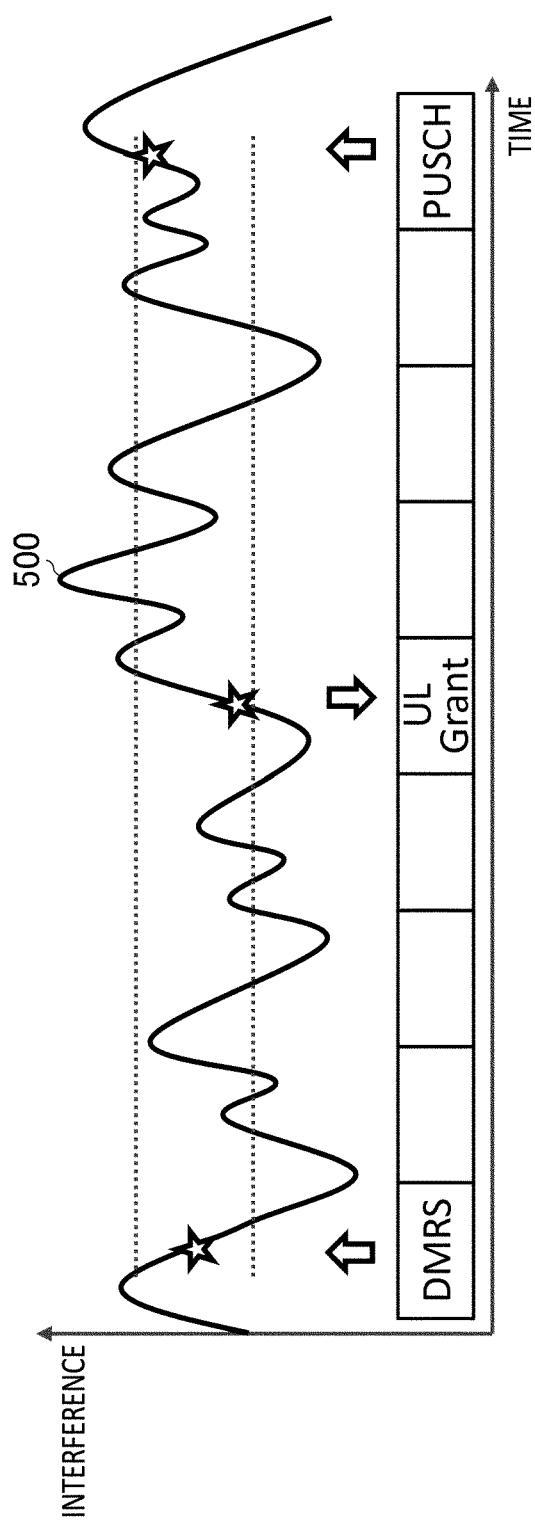
FIG. 3 schematically illustrates an example of an interference variation 500 of a user terminal 400.

FIG. 3 schematically illustrates an example of an interference variation 500 of the user terminal 400. When the user terminal 400 is covered by a radio base station on the ground, the interference experienced by the user terminal 400 does not vary too much. However, when the user terminal 400 is covered by the HAPS 100, since the multi-cell 110 circles, the multi-cell 110 moves, or a locational relationship between each of the plurality of cells 120 changes according to the flight state of the HAPS 100, as exemplified in FIG. 3, the interference experienced by the user terminal 400 largely varies.

In a conventional radio base station, a DMRS received from the user terminal 400 covered by the radio base station has been analyzed to determine a CQI (Channel Quality Indicator) to decide an MCS, and the MCS has been assigned to the user terminal 400 by UL Grant (PDCCH (Physical Downlink Control Channel)). The user terminal 400 has performed PUSCH (Physical Uplink Shared CHannel) transmission by using the assigned MCS. In a case of the radio base station on the ground, there has been no large difference in the interference experienced by the user terminal 400 at timing at which the radio base station receives the DMRS and timing at which the user terminal 400 performs the PUSCH transmission.

However, in a case of the HAPS 100, as exemplified in FIG. 3, a chance in which a difference occurs in the interference experienced by the user terminal 400 at the timing at which the DMRS is received (timing at which the MCS is decided) and the timing at which the user terminal 400 performs the PUSCH transmission becomes higher as compared with that of the radio base station on the ground. For example, when the interference at the time of the MCS decision is higher than the interference at the time of the PUSCH transmission, an MCS that is too small is assigned as a result, and the throughput of the user terminal 400 falls. In addition, for example, when the interference at the time of the MCS decision is lower than the interference at the time of the PUSCH transmission, numerous CRC (Cyclic Redundancy Check) errors are generated, and the throughput of the user terminal 400 falls.

Figure 4:
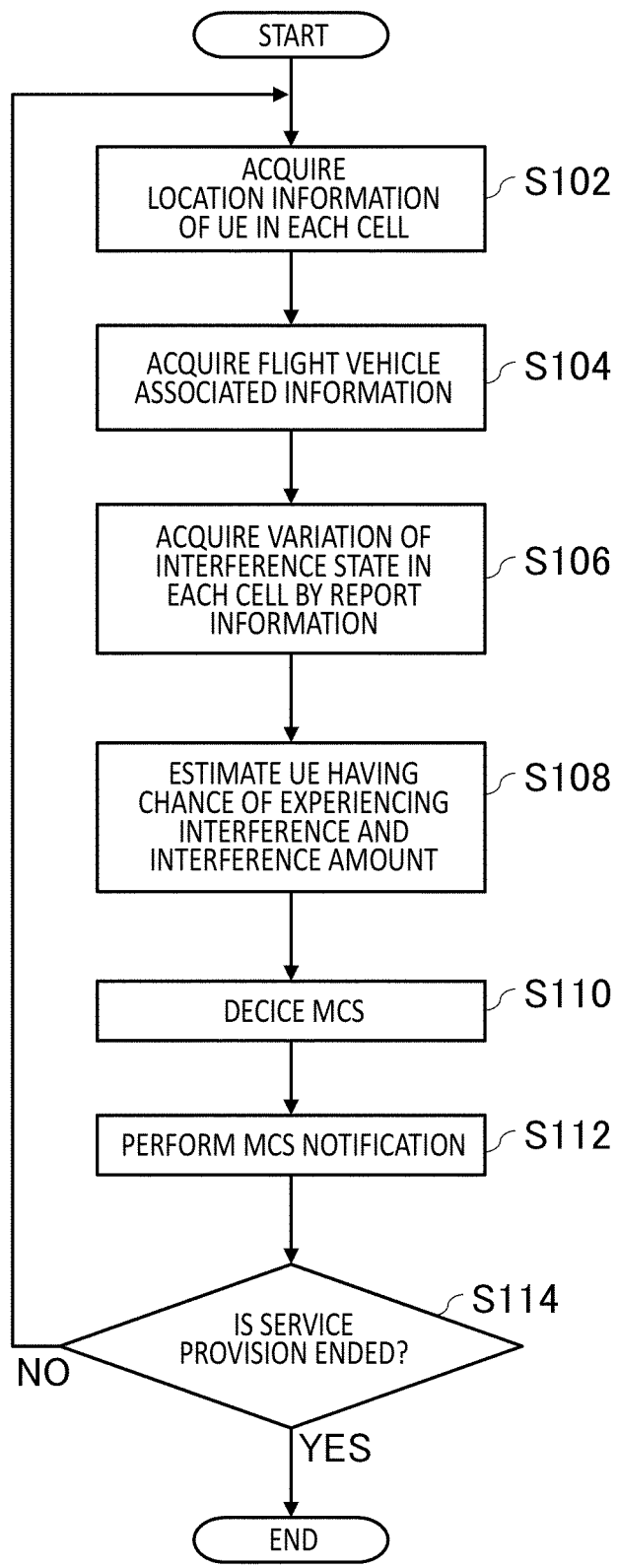
FIG. 4 schematically illustrates an example of a flow of processing which is executed by a base station device 300.

FIG. 4 schematically illustrates an example of a flow of processing which is executed by the base station device 300. Herein, a state where a plurality of user terminals 400 are present in the multi-cell 110 is used as a start state in the description.

In step (step may be abbreviated and denoted as S) 102, location information of the user terminal 400 in each cell 120 is acquired. In S104, flight vehicle associated information (such as a latitude and a longitude, an altitude, an orientation, and a gradient) is acquired.

In S106, a variation of the interference state in each cell 120 is acquired by report information transmitted by the user terminals 400 present in the multi-cell 110. The base station device 300 acquires the variation of the interference state in each cell 120, for example, by an A3 event report or the like which is transmitted when a reception intensity from a neighboring cell becomes higher than a reception intensity from a primary cell by an offset or more and location information of the user terminal 400 which has transmitted the report.

In S108, the user terminal 400 having a chance of experiencing an interference and an interference amount are estimated with regard to each of the plurality of cells 120 based on the information acquired in S102, S104, and S106. The base station device 300 estimates the interference amount at the timing of the PUSCH transmission by the user terminal 400 based on these pieces of information, for example, at the timing at which the DMRS is received from the user terminal 400. For example, when it is predicted that an adjacent cell 120 approaches the user terminal 400 due to the flight state of the HAPS 100, the base station device 300 estimates an increase amount of the interference from a locational relationship between the user terminal 400 and the adjacent cell 120 and the presence of another user terminal 400 which is present in the adjacent cell 120 and located in proximity to the user terminal 400.

In S110, MCSs are decided which are to be assigned to the plurality of user terminals 400 present in the multi-cell 110. The base station device 300 decides an MCS based on the DMRS received from the user terminal 400 with regard to the user terminal 400 having no chance of experiencing an interference, and decides an MCS by taking into account the interference amount estimated in S108 with regard to the user terminal 400 having a chance of experiencing an interference. For example, when the interference increases more at the timing at which the user terminal 400 performs the PUSCH transmission than that at the timing at which the DMRS is received, the base station device 300 decides an MCS with an index value less than that of the MCS decided based on the DMRS as the MCS to be assigned to the user terminal 400. In S112, the user terminals 400 are notified of the MCSs decided in S110.

In S114, it is determined whether provision of the wireless communication service is to be ended. When it is determined that the provision is not to be ended, the flow returns to S102, and when it is determined that the provision is to be ended, the processing is ended.

Figure 5:
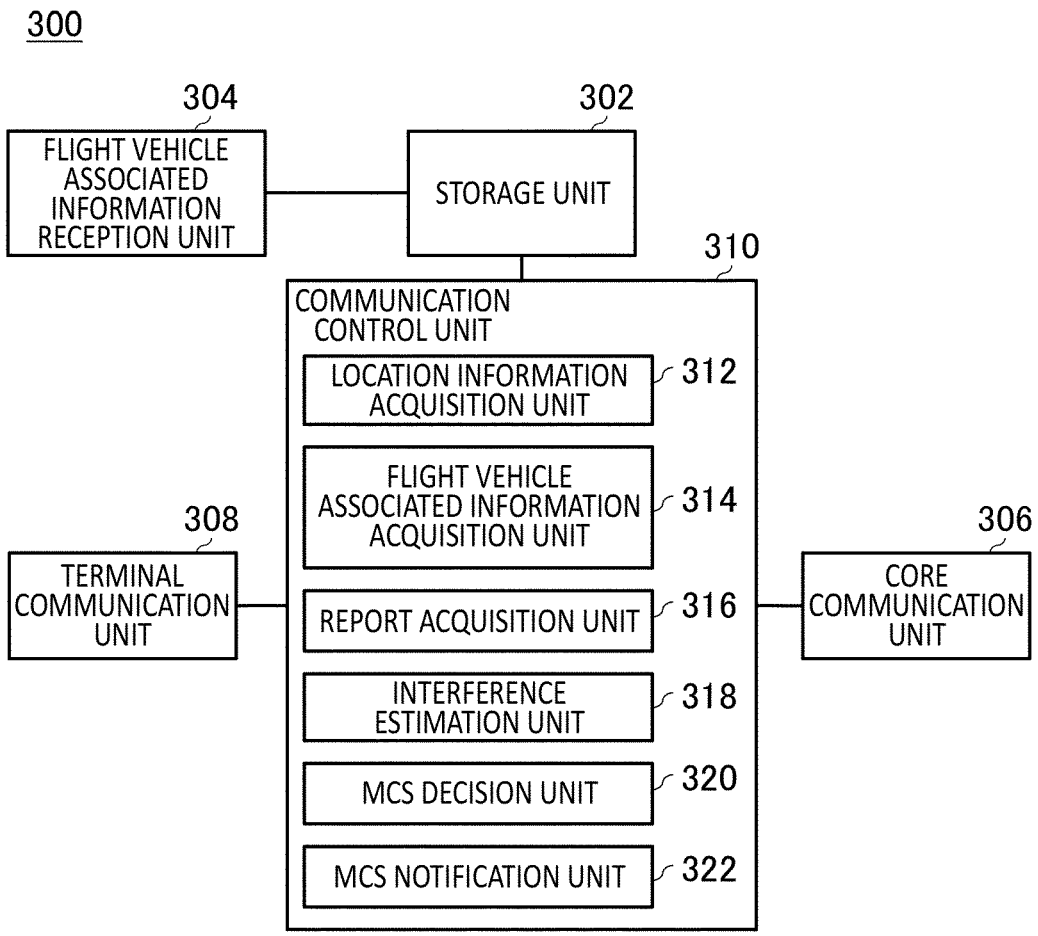
FIG. 5 schematically illustrates an example of a functional configuration of the base station device 300.

FIG. 5 schematically illustrates an example of a functional configuration of the base station device 300. The base station device 300 includes a storage unit 302, a flight vehicle associated information reception unit 304, a core communication unit 306, a terminal communication unit 308, and a communication control unit 310.

The flight vehicle associated information reception unit 304 receives flight vehicle associated information from the flight control device. The flight vehicle associated information reception unit 304 receives, for example, location information of the HAPS 100. The flight vehicle associated information reception unit 304 receives, for example, attitude information of the HAPS 100. The flight vehicle associated information reception unit 304 receives, for example, pitch, roll, and yaw information of the HAPS 100. In addition, the flight vehicle associated information reception unit 304 receives wind power information output by a wind sensor. The flight vehicle associated information reception unit 304 stores the received information in the storage unit 302.

The core communication unit 306 communicates with a core network. The core communication unit 306 may establish the feeder link 102 with the gateway 40 by the FL antenna for communication with the gateway 40 on the ground. The core communication unit 306 may communicate with the core network on the ground via the feeder link 102.

The terminal communication unit 308 communicates with the user terminal 400. The terminal communication unit 308 may form the multi-cell 110 by irradiating the beam 104 towards the ground by using the SL antenna. The terminal communication unit 308 may establish a service link with the user terminal 400 in the multi-cell 110.

The communication control unit 310 controls communication of the user terminal 400. The communication control unit 310 performs establishment of wireless communication connection with the user terminal 400 or the like to assign a radio resource to the user terminal 400 and control the communication of the user terminal 400.

The communication control unit 310 includes a location information acquisition unit 312, a flight vehicle associated information acquisition unit 314, a report acquisition unit 316, an interference estimation unit 318, an MCS decision unit 320, and an MCS notification unit 322.

The location information acquisition unit 312 acquires location information of the user terminal 400 present in the multi-cell 110. The location information acquisition unit 312 may acquire the location information of the user terminal 400 which has been received by the terminal communication unit 308 from the user terminal 400. The user terminal 400 may measure its own location information by at least any of, for example, GPS positioning, base station positioning, or Wi-Fi (registered trademark) positioning.

The flight vehicle associated information acquisition unit 314 acquires flight vehicle associated information. The flight vehicle associated information acquisition unit 314 may acquire flight vehicle associated information stored in the storage unit 302.

The report acquisition unit 316 acquires the report information related to a reception radio wave by the user terminal 400 which has been received from the user terminal 400 present in the multi-cell 110. The report acquisition unit 316 may indicate a reception intensity of the radio wave received by the user terminal 400. In addition, the report acquisition unit 316 may indicate an interference amount of the interference experienced by the user terminal 400. The report acquisition unit 316 acquires, for example, an A3 event report.

The interference estimation unit 318 estimates an interfered user terminal having a chance of experiencing an interference from a cell 120 other than a cell 120 in which the user terminal 400 is present among a plurality of user terminals 400 present in the multi-cell 110, and an interference amount. The interference estimation unit 318 may use location information of each of the plurality of user terminals 400 which has been acquired by the location information acquisition unit 312 for the estimation. The interference estimation unit 318 may use the flight vehicle associated information acquired by the flight vehicle associated information acquisition unit 314 for the estimation. The interference estimation unit 318 may use the report information acquired by the report acquisition unit 316 for the estimation.

The interference estimation unit 318 may store, in the storage unit 302, association data in which the flight vehicle associated information of the HAPS 100 which patrols in a predetermined flight path which has been acquired by the flight vehicle associated information acquisition unit 314, the location information of the user terminal 400 which has been acquired by the location information acquisition unit 312, and the interference amount to be experienced by the user terminal 400 which has been received by the user terminal 400 are associated with each other. Then, the interference estimation unit 318 may use past association data stored in the storage unit 302 as training data, and generate and store an estimation model which estimates an interference amount to be experienced by the plurality of the user terminals 400 from the location information of the plurality of user terminals 400 present in the multi-cell 110 and the flight vehicle associated information in the storage unit 302. The interference estimation unit 318 may estimate an interference amount of each of the plurality of user terminals 400 by using the estimation model.

The interference estimation unit 318 may identify a locational relationship between the plurality of mutual cells 120 constituting the multi-cell 110 based on the report information acquired by the report acquisition unit 316. The interference estimation unit 318 may store, in the storage unit 302, association data in which the flight vehicle associated information, the locational relationship of the plurality of mutual cells 120, the location information of the user terminal 400, and the interference amount to be experienced by the user terminal 400 are associated with each other. Then, the interference estimation unit 318 may use past association data stored in the storage unit 302 as training data, and generate and store an estimation model which estimates the interference amount to be experienced by the plurality of the user terminals 400 from the locational relationship of the plurality of mutual cells 120, the location information of the plurality of user terminals 400 present in the multi-cell 110, and the flight vehicle associated information in the storage unit 302. The interference estimation unit 318 may estimate the interference amount of each of the plurality of user terminals 400 by using the estimation model.

The interference estimation unit 318 may estimate, at timing at which the DMRS is received from the interfered user terminal, the interference amount at timing of the PUSCH of the interfered user terminal based on the DMRS, location information of the interfered user terminal, and the flight vehicle associated information. The interference estimation unit 318 may estimate, at the timing at which the DMRS is received from the interfered user terminal, an interference amount that has been experienced by the interfered user terminal at the timing at which the DMRS is received, and a variation of the interference amount at the timing of the PUSCH of the interfered user terminal while the interference amount is set as a reference.

The MCS decision unit 320 decides MCSs to be assigned to the plurality of user terminals 400 present in the multi-cell 110. The MCS decision unit 320 may decide an MCS based on the DMRS received from the user terminal 400 with regard to the user terminal 400 determined to have no chance of experiencing an interference from a cell other than the cell in which the user terminal 400 is present.

The MCS decision unit 320 decides an MCS to be assigned to the interfered user terminal based on the interference amount estimated by the interference estimation unit 318 with regard to the user terminal 400 determined to have a chance of experiencing an interference from a cell other than the cell in which the user terminal 400 is present. When an interference amount at the timing of the PUSCH of the interfered user terminal is estimated by the interference estimation unit 318, the MCS decision unit 320 may decide the MCS based on the interference amount.

When an interference amount that has been experienced by the interfered user terminal at the timing at which the DMRS is received and a variation of the interference amount at the timing of the PUSCH of the interfered user terminal while the interference amount is set as the reference are estimated by the interference estimation unit 318, the MCS decision unit 320 may decide the MCS to be assigned to the interfered user terminal based on these. For example, the MCS decision unit 320 provisionally decides an MCS based on the DMRS by using a conventional technique, and decides the MCS to be assigned to the interfered user terminal by adjusting the provisionally decided MCS based on the variation of the interference amount.

For example, when the interference amount at the timing of the PUSCH of the interfered user terminal is more than that at the timing at which the DMRS is received, the MCS decision unit 320 decides an MCS with an index value less than that of the MCS decided based on the DMRS. As the variation of the interference amount is further increased, the MCS decision unit 320 may decide an MCS with a still smaller number than that of the MCS decided based on the DMRS. Thus, as compared with a case where the MCS decided based on the DMRS is assigned, the generation of the CRC errors can be suppressed, and it is possible to contribute to an improvement of the throughput of the user terminal 400.

For example, when the interference amount at the timing of the PUSCH of the interfered user terminal is less than that at the timing at which the DMRS is received, the MCS decision unit 320 decides an MCS with an index value more than that of the MCS decided based on the DMRS. As the variation of the interference amount is further increased, the MCS decision unit 320 may decide an MCS with a still larger number than that of the MCS decided based on the DMRS. Thus, as compared with a case where the MCS decided based on the DMRS is assigned, a frequency resource can be effectively utilized, and it is possible to contribute to an improvement of the throughput of the user terminal 400.

The MCS notification unit 322 notifies the user terminal 400 of the MCS decided by the MCS decision unit 320. The MCS notification unit 322 assigns the MCS to the user terminal 400 by the UL Grant (PDCCH).

Figure 6:
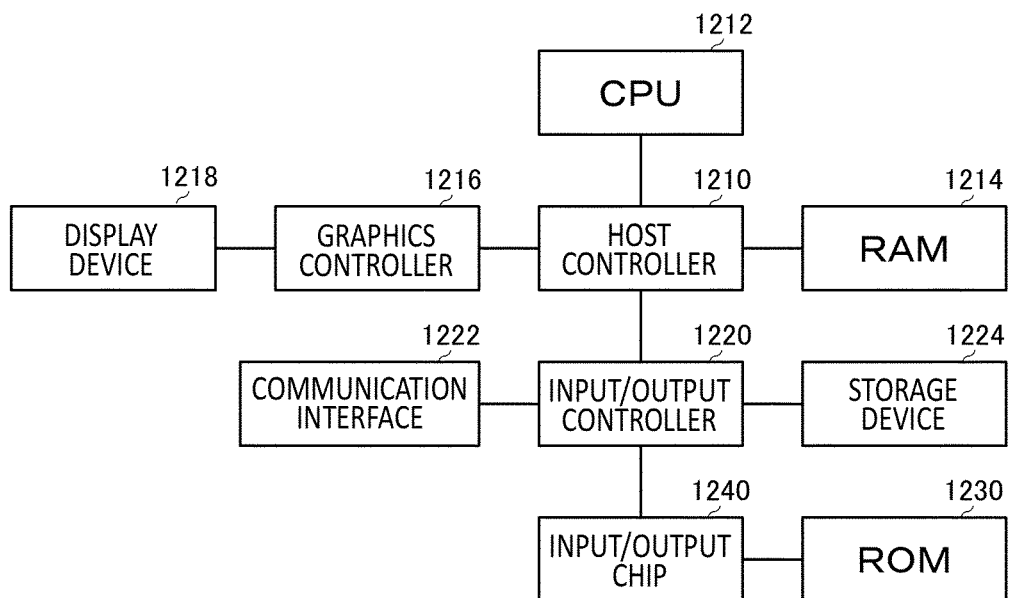
FIG. 6 schematically illustrates an example of a hardware configuration of a computer 1200 which functions as the base station device 300.

FIG. 6 schematically illustrates an example of a hardware configuration of a computer 1200 which functions as the base station device 300. Programs installed in the computer 1200 can cause the computer 1200 to function as one or more "units" of the device according to the present embodiment or can cause the computer 1200 to execute operations associated with the devices according to the present embodiment or the one or more "units", and/or can cause the computer 1200 to execute a process according to the present embodiment or steps of the process. Such a program may be executed by a CPU 1212 to cause the computer 1200 to perform specific operations associated with some or all of the blocks in the flowcharts and block diagrams described in the specification.

The computer 1200 according to the present embodiment includes a CPU 1212, a RAM 1214, and a graphics controller 1216, which are connected to each other via a host controller 1210. In addition, the computer 1200 includes input/output units such as a communication interface 1222, a storage device 1224, and a DVD drive and an IC card drive, which are connected to the host controller 1210 through an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer readable storage medium such as the DVD-ROM or the IC card. The program is read from the computer readable storage medium, installed into the storage device 1224, RAM 1214, or ROM 1230, which are also examples of a computer readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The programs or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of devices responsible for performing operations. A specific step and "unit" may be implemented by dedicated circuitry, programmable circuitry supplied along with a computer readable instruction stored on a computer readable storage medium, and/or a processor supplied along with the computer readable instruction stored on the computer readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer readable storage medium may include any tangible device capable of storing an instruction performed by an appropriate device, so that the computer readable storage medium having the instruction stored thereon constitutes a product including an instruction that may be performed in order to provide means for performing an operation specified by a flowchart or a block diagram. An example of the computer readable storage medium may include an electronic storage medium, a magnetic storage medium, an optical storage medium, an electromagnetic storage medium, or a semiconductor storage medium. More specific examples of computer readable storage media may include a floppy disc (registered trademark), a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

The computer readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer readable instruction to provide means for performing operations specified by the flowchart or the block diagram. An example of the processor includes a computer processor, a processing unit, a microprocessor, a digital signal processor, a controller, a microcontroller, or the like.

According to the above described embodiment, the HAPS 100 has been used in the description as an example of the flight vehicle having the antenna which forms the wireless communication area by irradiating the beam towards the ground to provide the wireless communication service to the user terminal in the wireless communication area, but the flight vehicle is not limited to this. Examples of the flight vehicle include a balloon, an airship, an aircraft, and an unmanned flight vehicle such as a drone which can form the wireless communication area.

While the present invention has been described above by way of the embodiments, the technical scope of the present invention is not limited to the scope of the claims according to the above described embodiments. It is apparent to persons skilled in the art that various alterations or improvements can be added to the above described embodiments. It is also apparent from the scope of the claims that the embodiments added with such alterations or improvements can be included in the technical scope of the present invention.

The operations, procedures, steps, stages, and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network; 40: gateway; 100: HAPS; 102: feeder link; 104: beam; 110: multi-cell; 120: cell; 122: cell; 124: cell; 130: main body section; 140: wing section; 150: solar panel; 200: flight control device; 300: base station device; 302: storage unit; 304: flight vehicle associated information reception unit; 306: core communication unit; 308: terminal communication unit; 310: communication control unit; 312: location information acquisition unit; 314: flight vehicle associated information acquisition unit; 316: report acquisition unit; 318: interference estimation unit; 320: MCS decision unit; 322: MCS notification unit; 400, 402, 404, 406, 408: user terminal; 500: interference variation; 1200: computer; 1210: host controller; 1212: CPU; 1214: RAM; 1216: graphics controller; 1218: display device; 1220: input/output controller; 1222: communication interface; 1224: storage device; 1230: ROM; 1240: input/output chip.

What is claimed is:

1. A base station device which is mounted to a flight vehicle and forms a multi-cell including a plurality of cells on a ground to provide a wireless communication service to a user terminal in the multi-cell, the base station device comprising:
    a location information acquisition unit which acquires location information of a user terminal present in the multi-cell;
    a flight vehicle associated information acquisition unit which acquires flight vehicle associated information including location information and attitude information of the flight vehicle;
    an interference estimation unit which estimates, based on location information of a plurality of the user terminals and the flight vehicle associated information, an interfered user terminal having a chance of experiencing an interference from a cell other than a cell in which the user terminal is present among the plurality of user terminals and an interference amount;
    an MCS decision unit which decides an MCS of an uplink to be assigned to the interfered user terminal based on the interference amount; and
    an MCS notification unit which notifies the interfered user terminal of the MCS decided by the MCS decision unit.

2. The base station device according to claim 1, comprising:
    a report acquisition unit which acquires report information received from the user terminal present in the multi-cell and related to a reception radio wave by the user terminal, wherein
    the interference estimation unit estimates the interfered user terminal and the interference amount further based on the report information.

3. The base station device according to claim 2, wherein the report acquisition unit acquires an A3 event report received from the user terminal present in the multi-cell.

4. The base station device according to claim 1, comprising:
    a storage unit which stores association data in which the location information acquired by the location information acquisition unit, the flight vehicle associated information acquired by the flight vehicle associated information acquisition unit, and the interference amount experienced by the user terminal which is received from the user terminal are associated with each other, wherein
    the interference estimation unit uses a plurality of pieces of association data stored in the storage unit as training data to generate an estimation model which estimates an interference amount to be experienced by the plurality of user terminals from the location information of the plurality of user terminals present in the multi-cell and the flight vehicle associated information, and estimates the interfered user terminal having a chance of experiencing an interference from a cell other than the cell in which the user terminal is present and the interference amount by using the estimation model.

5. The base station device according to claim 2, comprising:
    a storage unit which stores association data in which the location information acquired by the location information acquisition unit, the flight vehicle associated information acquired by the flight vehicle associated information acquisition unit, and the interference amount experienced by the user terminal which is received from the user terminal are associated with each other, wherein
    the interference estimation unit uses a plurality of pieces of association data stored in the storage unit as training data to generate an estimation model which estimates an interference amount to be experienced by the plurality of user terminals from the location information of the plurality of user terminals present in the multi-cell and the flight vehicle associated information, and estimates the interfered user terminal having a chance of experiencing an interference from a cell other than the cell in which the user terminal is present and the interference amount by using the estimation model.

6. The base station device according to claim 3, comprising:
    a storage unit which stores association data in which the location information acquired by the location information acquisition unit, the flight vehicle associated information acquired by the flight vehicle associated information acquisition unit, and the interference amount experienced by the user terminal which is received from the user terminal are associated with each other, wherein
    the interference estimation unit uses a plurality of pieces of association data stored in the storage unit as training data to generate an estimation model which estimates an interference amount to be experienced by the plurality of user terminals from the location information of the plurality of user terminals present in the multi-cell and the flight vehicle associated information, and estimates the interfered user terminal having a chance of experiencing an interference from a cell other than the cell in which the user terminal is present and the interference amount by using the estimation model.

7. The base station device according to claim 1, wherein the interference estimation unit estimates, at timing at which a DMRS is received from the interfered user terminal, the interference amount at timing of PUSCH of the interfered user terminal based on the DMRS, location information of the interfered user terminal, and the flight vehicle associated information.

8. The base station device according to claim 2, wherein the interference estimation unit estimates, at timing at which a DMRS is received from the interfered user terminal, the interference amount at timing of PUSCH of the interfered user terminal based on the DMRS, location information of the interfered user terminal, and the flight vehicle associated information.

9. The base station device according to claim 3, wherein the interference estimation unit estimates, at timing at which a DMRS is received from the interfered user terminal, the interference amount at timing of PUSCH of the interfered user terminal based on the DMRS, location information of the interfered user terminal, and the flight vehicle associated information.

10. The base station device according to claim 4, wherein the interference estimation unit estimates, at timing at which a DMRS is received from the interfered user terminal, the interference amount at timing of PUSCH of the interfered user terminal based on the DMRS, location information of the interfered user terminal, and the flight vehicle associated information.

11. The base station device according to claim 7, wherein when the interference amount at the timing of the PUSCH of the interfered user terminal is more than that at the timing at which the DMRS is received, the MCS decision unit decides an MCS with an index value less than that of an MCS decided based on the DMRS.

12. The base station device according to claim 7, wherein when the interference amount at the timing of the PUSCH of the interfered user terminal is less than that at the timing at which the DMRS is received, the MCS decision unit decides an MCS with an index value larger than that of an MCS decided based on the DMRS.

13. The base station device according to claim 11, wherein when the interference amount at the timing of the PUSCH of the interfered user terminal is less than that at the timing at which the DMRS is received, the MCS decision unit decides an MCS with an index value larger than that of the MCS decided based on the DMRS.

14. A non-transitory computer-readable storage medium storing a program for causing a computer to function as a base station device, the base station device being mounted to a flight vehicle and forms a multi-cell including a plurality of cells on a ground to provide a wireless communication service to a user terminal in the multi-cell, the base station device comprising:
  a location information acquisition unit which acquires location information of a user terminal present in the multi-cell;
  a flight vehicle associated information acquisition unit which acquires flight vehicle associated information including location information and attitude information of the flight vehicle;
  an interference estimation unit which estimates, based on location information of a plurality of the user terminals and the flight vehicle associated information, an interfered user terminal having a chance of experiencing an interference from a cell other than a cell in which the user terminal is present among the plurality of user terminals and an interference amount;
  an MCS decision unit which decides an MCS of an uplink to be assigned to the interfered user terminal based on the interference amount; and
  an MCS notification unit which notifies the interfered user terminal of the MCS decided by the MCS decision unit.

15. A system comprising:
  the base station device according to claim 1; and
  the flight vehicle.

16. A control method executed by a base station device which is mounted to a flight vehicle and forms a multi-cell including a plurality of cells on a ground to provide a wireless communication service to a user terminal in the multi-cell, the control method comprising:
  acquiring location information of a user terminal present in the multi-cell;
  acquiring flight vehicle associated information including location information and attitude information of the flight vehicle;
  estimating an interference by estimating, based on location information of a plurality of the user terminals and the flight vehicle associated information, an interfered user terminal having a chance of experiencing an interference from a cell other than a cell in which the user terminal is present among the plurality of user terminals and an interference amount;
  deciding an MCS of an uplink to be assigned to the interfered user terminal based on the interference amount; and
  notifying the interfered user terminal of the MCS decided in the deciding the MCS.

* * * * *